W. O. STOUT.
ELECTRIC STEERING DEVICE FOR AUTOMOBILES.
APPLICATION FILED DEC. 8, 1916.
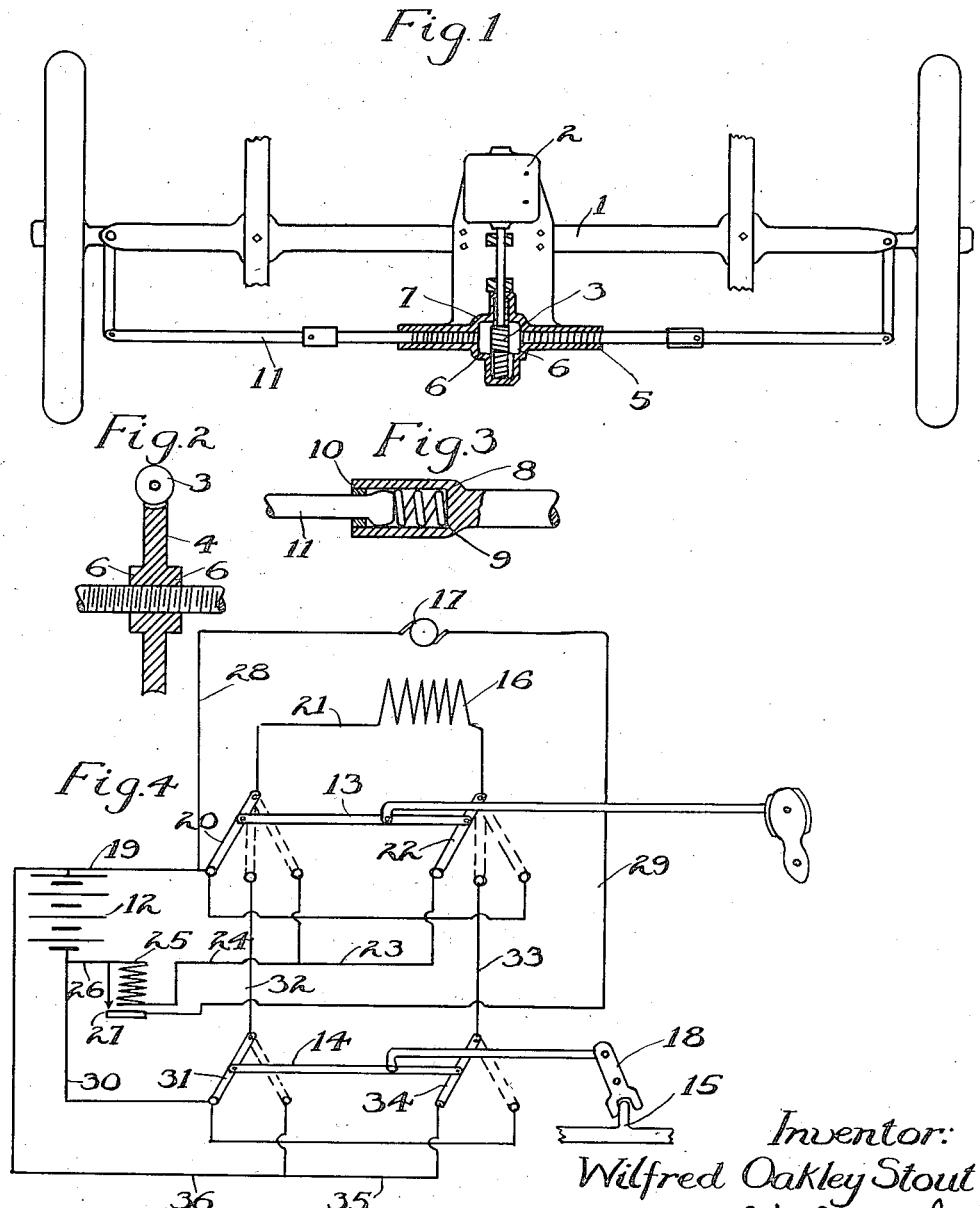

UNITED STATES PATENT OFFICE.

WILFRED OAKLEY STOUT, OF ST. PAUL, MINNESOTA.

ELECTRIC STEERING DEVICE FOR AUTOMOBILES.

1,281,428. Specification of Letters Patent. Patented Oct. 15, 1918.

Application filed December 8, 1916. Serial No. 135,905.

*To all whom it may concern:*

Be it known that I, WILFRED OAKLEY STOUT, a citizen of the United States, and a resident of St. Paul, in the county of Ramsey and State of Minnesota, have invented certain new and useful Improvements in Electric Steering Devices for Automobiles.

One object of my invention is to provide means for steering an automobile or the like by electrical power.

Another object of my invention is to provide in a steering device operated by electrical power, means for readily steering to the right, left or straight ahead.

Another object of my invention is to provide in an electrical steering device, means for energizing the electrical motor and causing it to turn the steering wheel to the right or left under control of a switch, and provide therewith means controllable by a central position of the switch, causing the electrical motor to bring the steering wheels back to a straight ahead position, and automatically cutting itself out of operation when the steering wheels are so positioned.

Another object of my invention is to provide in the tie rod of the steering knuckles of an automobile, spring controlled members for allowing a certain amount of movement of the steering wheels under control of the spring members without the turning of the steering mechanism.

Another object of my invention is to provide means for controlling the steering device with the foot instead of with the hand.

With these and incidental objects in view, the invention consists of certain novel features of construction and combination of parts, the essential elements of which are hereinafter described with reference to the drawing which accompanies and forms a part of this specification.

In the drawing, Figure 1 is a plan view of the front axle of an automobile with my improved steering device applied thereto partly in section to better show the operation of the mechanism.

Fig. 2 is a section taken on the line "AA," Fig. 1. Fig. 3 is a detail of the spring vibration absorbing means of the tie rods, and Fig. 4 is a schematic view of the circuit used with my electrical steering device in showing means for controlling the device, either by hand or by foot.

I prefer to mount on the front axle 1 of the automobile to which the device is applied, an electrical motor 2, driving a worm 3, meshing with the worm gear 4, through which passes with screw engagement, the tie rod 5.

Hubs 6, Figs. 1 and 2, are provided to take up the end thrust against the casing 7, also carried by the axle 1.

It is evident that the rotation of the motor in one direction will turn the steering wheels to the right, and a rotation in the opposite direction will turn the steering wheels to the left.

To absorb the vibration of the steering wheels from rough roads, etc., I terminate the tie rod 5 in a socket 8, in which is mounted a compression spring 9 bearing on the knob 10 of the outer end 11 of the tie rod.

In order to control the device properly, a switch must be provided and a circuit so wired, that when the switch is thrown to the left, the steering wheels will be turned in that direction, and vice versa, and furthermore so that should the switch be returned to its normal central position after it has been thrown to either right or left, the steering wheels will be brought to their straight ahead position by the motor, and the operating circuit of the motor cut out as soon as the steering wheels have reached their straight ahead position.

With the circuit as shown, and as will be hereinafter described, the motor will run and continue to turn the steering wheels so long as it is left in either right or left-handed position, so that with a slight turn to either right or left, the driver merely brings the switch over to the right or left position for an instant, as desired, and then moves it to its open position.

The steering wheel will then be set slightly in the desired direction, and the angle at which the steering wheels are set will depend upon the length of time the switch is left in the right or left-handed position, as the case may be.

In the circuit, as shown in Fig. 4, 12 is a storage battery or any suitable source of power. 13 is a single pole triple throw switch controllable by hand lever, or foot lever, and 14 is a second single pole double throw switch controlled by a knock-out 15 carried on the tie rod. 16 represents a field winding of the ordinary type of shunt motor, and 17 is the armature of the motor.

The knock-out 15 is so positioned on the tie rod with respect to the lever 18 that when the wheels are set straight ahead, the switch 14 is in its neutral or central position.

With the switch 14 in its neutral position, and the switch 13 set manually in its central position, no current is taken by the motor, as is readily seen from the circuit.

Should, however, the switch 13 be thrown to the position shown in full in the circuit, current will flow from the battery 12 through the following circuit:

Wire 19, switch blade 20, wire 21, field winding 16, switch blade 22, wire 23, wire 24, relay winding 25, wire 26 to the other side of the battery 12.

This circuit energizes the relay winding 25, closing the contact 27, supplying current to the armature 17 of the motor through contact 27, wires 19, 28 and 29.

With the current going through the field winding 16 in this direction, the automobile is steered to the left so long as the switch is closed.

In turning the wheels to the left, the knockout 15 has traveled to the right, thereby throwing the switch 14 in the position shown full in the drawing, so that when the switch 13 is set at its central position, current is supplied to the field winding through the following circuit:

Wire 30, switch blade 31, wire 32, wire 21, field winding 16, switch blade 22, wire 33, switch blade 34, wires 35 and 36 to the other side of the battery 12.

This reverses the current flow in the winding 16 of the motor, straightens up the steering wheels, and when the knockout approaches its central position, it again engages with the lever 18, and when this lever is moved sufficiently to position the switch 14 in its normal position, the current is cut off from the field winding 16, and hence the steering operation ceases.

It is evident that the same operation holds in steering to the left, and no current will be taken except when the steering device is actually in use.

While I have described my invention and illustrated it in one particular design, I do not wish it understood that I limit myself to this construction, as the application of my invention may be varied in many ways within the scope of the following claims.

Claims:

1. In electrical steering devices, the combination with mechanical means for positioning the steering wheels of an automobile with which the device is used, of an electrical motor, means associated with said motor for moving said mechanical means to the right or left, depending upon the direction of rotation of said motor, a manually controllable switch for determining the direction of rotation of said motor, and an automatic switch controllable by the position of said mechanical means for automatically positioning said mechanical means.

2. In electrical steering devices, the combination of an electrical motor, a double pole three positioned switch electrically connected with the field winding of said motor and manually operable, a circuit closing device operable by the electrical condition of said field winding for supplying the armature of said motor with current, a knockout controllable by the position of the steering wheels of the automobile to which said device is applied.

3. In electrical steering devices, the combination of a tie rod adapted to be attached to the steering knuckles of an automobile, vibration absorbing means, an electrical motor adapted to position said tie rod, a switch manually controllable for determining the direction of rotation of said motor, and a second switch automatically controllable by the position of said tie rod for bringing said tie rod to its central position when current is supplied to the circuit controlled by said automatically controlled switch.

4. In electrical steering devices, the combination of a tie rod, an electrical motor having a field winding and an armature winding, means controllable by said electrical motor for positioning said tie rod, a reversing switch having three positions for determining the direction of rotation of said motor, a knockout on said tie rod, an automatic switch controlled by said knockout, and electrical connections between said switches and said motor, and a source of current supply.

WILFRED OAKLEY STOUT.